United States Patent
Kezobo et al.

(10) Patent No.: US 9,397,592 B2
(45) Date of Patent: Jul. 19, 2016

(54) MOTOR CONTROL DEVICE AND ELECTRIC POWER STEERING DEVICE

(75) Inventors: Isao Kezobo, Chiyoda-ku (JP); Kosuke Nakano, Chiyoda-ku (JP); Yoshihito Asao, Chiyoda-ku (JP); Akira Furukawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/351,382

(22) PCT Filed: Jan. 27, 2012

(86) PCT No.: PCT/JP2012/051830
§ 371 (c)(1),
(2), (4) Date: Apr. 11, 2014

(87) PCT Pub. No.: WO2013/111327
PCT Pub. Date: Aug. 1, 2013

(65) Prior Publication Data
US 2014/0246999 A1  Sep. 4, 2014

(51) Int. Cl.
*H02K 29/06* (2006.01)
*H02P 6/10* (2006.01)
*H02P 29/02* (2016.01)
*B62D 5/04* (2006.01)
*H02P 25/22* (2006.01)

(52) U.S. Cl.
CPC ............... *H02P 6/10* (2013.01); *B62D 5/0484* (2013.01); *B62D 5/0487* (2013.01); *H02P 25/22* (2013.01); *H02P 29/022* (2013.01); *H02P 29/023* (2013.01)

(58) Field of Classification Search
CPC .... B62D 5/0484; B62D 6/046; B62D 5/0463; H02P 29/022
See application file for complete search history.

(56) References Cited

U.S. PATENT DOCUMENTS

| 8,831,832 B2* | 9/2014 | Hoshi | B62D 5/0463 |
| | | | 318/400.23 |
| 2007/0146169 A1* | 6/2007 | Otsuka | B62D 5/046 |
| | | | 341/15 |
| 2008/0035411 A1 | 2/2008 | Yamashita et al. | |

(Continued)

FOREIGN PATENT DOCUMENTS

CN       101401295 A       4/2009
EP       2 009 782 A1      12/2008

(Continued)

OTHER PUBLICATIONS

International Search Report of PCT/JP2012/051830 dated Apr. 24, 2012.

(Continued)

*Primary Examiner* — Shawki S Ismail
*Assistant Examiner* — Zoheb Imtiaz
(74) *Attorney, Agent, or Firm* — Sughrue Mion, PLLC

(57) ABSTRACT

There is provided a motor control device for controlling a motor including plural sets of windings, which is configured so that, when a fault detection means detects a fault, inverters in the normal side other than in the fault side are continued to be controlled by normal-time current control means and further, inverters in the fault side are continued to be controlled by fault-time voltage commands generated by a fault-time current control means configured with a fault-time normal-side command generator and a fault-time fault-side command generator, so as to emphasis a torque ripple of the motor when a winding fault of the motor or an inverter fault occurs, to thereby cause a user to surely recognize the fault.

11 Claims, 13 Drawing Sheets

(56) References Cited

U.S. PATENT DOCUMENTS

| | | | |
|---|---|---|---|
| 2009/0021207 A1 | 1/2009 | Kezobo et al. | |
| 2011/0074333 A1 | 3/2011 | Suzuki | |
| 2013/0179040 A1* | 7/2013 | Suzuki | B62D 5/0403 701/43 |
| 2013/0320905 A1* | 12/2013 | Uryu | H02K 11/001 318/490 |
| 2014/0183941 A1* | 7/2014 | Bae | B60L 3/0069 307/10.1 |

FOREIGN PATENT DOCUMENTS

| | | |
|---|---|---|
| JP | 06-344937 A | 12/1994 |
| JP | 2008-037399 A | 2/2008 |
| JP | 2010-252485 A | 11/2010 |
| JP | 2011-078230 A | 4/2011 |
| WO | 2007/129359 A1 | 11/2007 |

OTHER PUBLICATIONS

Communication dated Mar. 3, 2015 from the Japanese Patent Office in counterpart application No. 2013-555082.

Communication dated Dec. 29, 2015, issued by the State Intellectual Property Office of the P.R.C. in corresponding Chinese Application No. 201280068078.6.

Communication dated Mar. 1, 2016, issued by the European Patent Office in corresponding European Application No. 12866663.3.

* cited by examiner (a)

(b)

(a)

(b)

(c)

(a)

(b)

(a)

(b)

(c)

(a)

(b)

(c)

(a)

(b)

MOTOR CONTROL DEVICE AND ELECTRIC POWER STEERING DEVICE

CROSS REFERENCE TO RELATED APPLICATIONS

This is a National Stage of International Application No. PCT/JP2012/051830filed Jan. 27, 2012, the content of all of which is incorporated herein by reference in its entirety.

TECHNICAL FIELD

This invention relates to a motor control device for controlling a multiphase motor including plural sets of windings, and an electric power steering device using the motor control device.

BACKGROUND ART

As an example of conventional motor control devices, there is a device which is described, for example, in the following Patent Document 1 (International Publication WO2007/129359). The device described in Patent Document 1 is configured with a single set of windings with an inverter. When a short-circuit fault occurs in the windings or the inverter, the device continues controlling by switching its control mode to that by an abnormal-time current control means matched with the state of the fault, so as to reduce a brake torque due to a current flowing through a short-circuit path, thereby suppressing a torque ripple.

Meanwhile, a device described in Patent Document 2 (Japanese Patent Application Laid-open No. 2011-78230) is configured with two respective sets of windings and inverters, and this document discloses that, when a switching element in the inverters causes a short-circuit fault, the device corrects its control as against this fault by using a non-fault system so as to negate a brake torque against the rotating operation of the motor or to reduce influence thereof on the rotating operation of the motor.

CITATION LIST

Patent Document

Patent Document 1: International Publication WO2007/129359
Patent Document 2: Japanese patent Application Laid-open No. 2011-78230

SUMMARY OF THE INVENTION

Problems to be Solved by the Invention

According to the example described in Patent Document 1, its cost is very low because of having a single sets of windings with the inverter; however, there is a problem that, if a short-circuit fault occurs, among the motor rotation angle of 360 degrees, an angle capable of generating torque in the same direction of the required torque, namely, a positive torque, is approx. 300 degrees, which is insufficient in reduction of the brake torque and in suppression of the torque ripple although some levels of them that are consistent with the cost is achieved, and further, it is unable to provide a sufficient output torque.

Meanwhile, with respect to the example described in patent Document 2, there is illustrated in FIG. 7 a waveform of phase current and a motor torque for each of the case where an upper-side switching element of the inverter causes a short-circuit fault and the case where a wiring that connects between the inverter and the winding causes a short-circuit fault to a power source (namely, in the case of a voltage short-circuit).

Since a brake torque thus illustrated is generated, in order to correct the torque, a control is made to add a reverse characteristic thereto using a positive-side torque.

As a result, there is a problem that variation in torque becomes small, so that the driver is difficult to recognize the fault.

This invention has been made to solve the problems described above, and an object thereof is to provide a motor control device which can emphasize a torque ripple at the occurrence of a fault in the motor windings or a fault in the inverters (for example, a short-circuit fault of the switching element, an earth short-circuit fault or a voltage short-circuit fault of a one phase winding or a wiring connecting between the inverter and the wiring, or an interphase short-circuit fault, etc.), to thereby cause the user to surely recognize the occurrence of the fault.

Means for Solving the Problems

A motor control device according to the invention is a motor control device which controls a motor including plural sets of windings, comprising:
a plurality of inverters each having switching elements for respective phases of each of the plural sets of windings, which control voltages applied to the respective phases; a current control means which controls currents caused to flow the plural sets of windings, by giving to each of the inverters, voltage commands corresponding to the voltages applied to the respective phases, according to a total required torque-current value that is equivalent to a target value of a torque to be generated by the motor; and a fault detection means which detects a short-circuit fault in the switching elements, or an earth short-circuit or voltage short-circuit fault in the inverters or the plural sets of windings;
wherein the current control means has a normal-time current control means which is used at normal time so as to control, respectively, the currents caused to flow the plural sets of windings, and a fault-time current control means which generates a fault-time voltage command according to a content of the fault detected by the fault detection means; and
wherein, when the fault detection means detects the fault, the current control means continues controlling the inverter in the normal side by the normal-time current control means while continuing controlling the inverter in the fault side by the fault-time voltage command generated by the fault-time current control means.

Effect of the Invention

According to the invention, when a fault detection means detects a fault, since the current control means continues controlling the normal side inverter by the normal-time current control means while also continuing controlling the fault-side inverter by a fault-time voltage command, it is possible to produce a torque ripple larger than the brake torque generated by the short-circuit fault, to thereby cause the user to surely recognize the occurrence of the fault.

MODES FOR CARRYING OUT THE INVENTION

Figure 1:
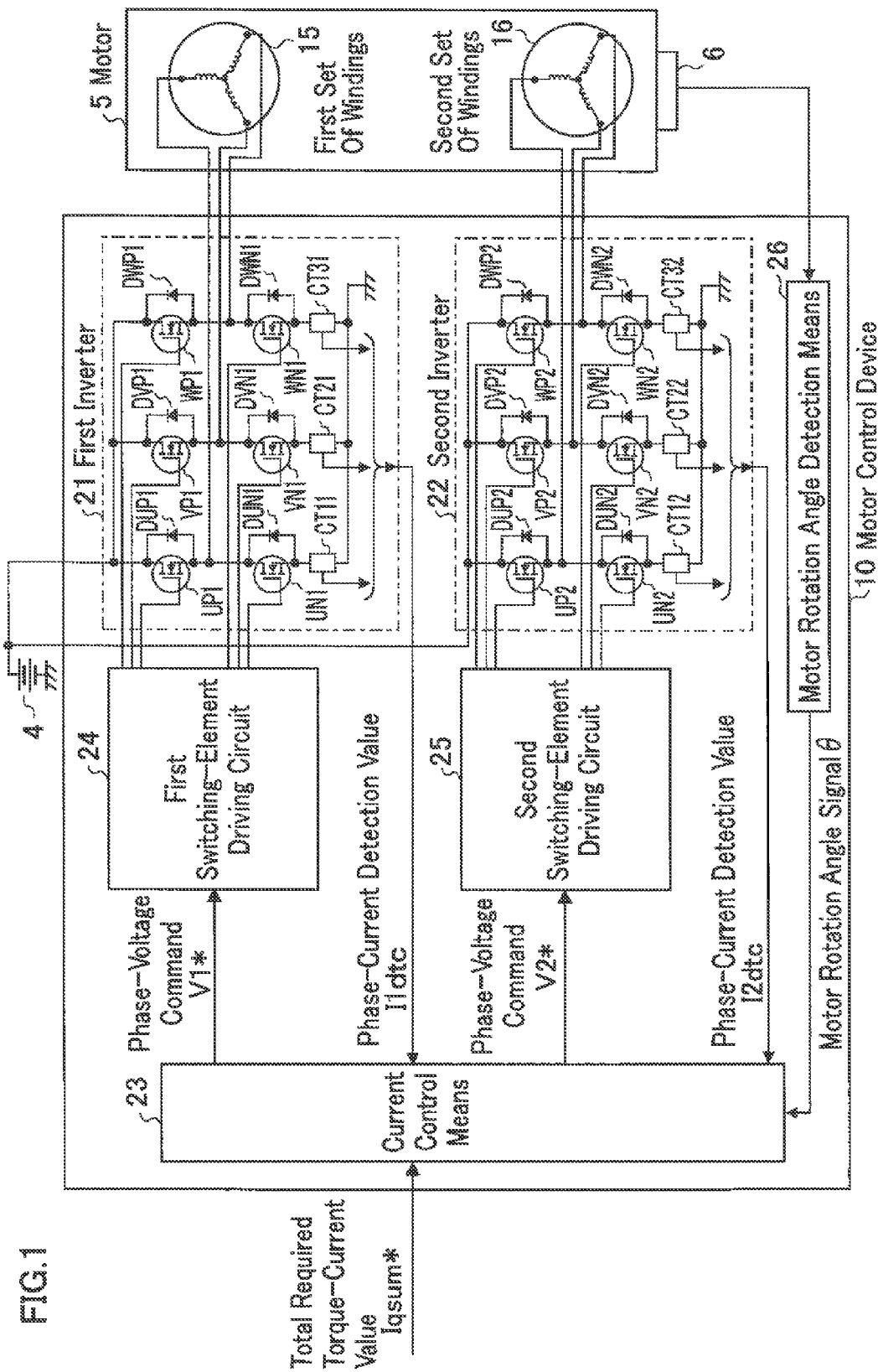
FIG. 1 is a diagram showing a configuration of a motor control device according to Embodiment 1.

Hereinafter, an exemplified embodiment of the invention will be described on the basis of the drawings. Note that, among the drawings, the same reference numerals represent the same or equivalent objects.

Embodiment 1

FIG. 1 is a block diagram showing a whole configuration of a motor control device according to Embodiment 1.

Further shown in FIG. 1 other than a motor control device 10 are a power source 4, a motor 5 and a motor rotation angle sensor 6 for detecting a rotation angle θ of the motor 5. The motor 5 includes a first set of windings 15 comprising windings of three phases of a U1-phase, a V1-phase and a W1-phase, and a second set of windings 16 comprising windings of three phases of a U2-phase, a V2-phase and a W2-phase, and the respective sets of windings are phase-connected by star connection, respectively.

With these plural sets of windings (in the illustrated case in FIG. 1, two sets of windings), a stator not shown in the figure is configured, and the motor 5 is configured with the stator, a rotor not shown in the figure, and a rotary shaft fixed to the rotor.

In is noted that, in the following description, the invention will be described citing a case where it is applied to a permanent magnet synchronous motor in which each set of windings are formed of three phases and a permanent magnet is disposed as the rotor; however, the invention is usable for a motor that is rotationally driven by multi-phase currents of three or more phases.

Further, although the windings are star-connected in this case, a similar effect will be achieved instead by delta-connecting the windings. The motor control device 10 controls voltages applied to the windings of the motor 5, thereby to supply power from the power source 4 to the motor 5 and to control currents caused to flow through the windings, resulting in controlling an output torque of the motor that is almost proportional to these currents.

In the motor control device 10, upon receiving a signal from the motor rotation angle sensor 6, a rotation angle signal θ of the motor is calculated by a motor rotation-angle detection means 26. Further, phase currents flowing through respective phases of the motor 5 are detected by current detection circuits CT11, CT21, CT31, CT12, CT22 and CT32, so that phase-current detection values Iu1dtc, Iv1dtc, Iw1dtc, Iu2dtc, Iv2dtc and Iw2dtc are obtained.

Note that, in FIG. 1, the phase-current detection values Iu1dtc, Iv1dtc and Iw1dtc in the side of the first set of windings 15 are indicated as I1dtc, and the phase-current detection values Iu2dtc, Iv2dtc and Iw2dtc in the side of the second set of windings 16 are indicated as I2dtc.

Further, in FIG. 1, although the motor rotation angle sensor 6 and the motor rotation-angle detection means 26 are provided, the motor rotation angle signal may be obtained, in such a general way, from an estimated motor rotation angle by using an estimation means.

As described later, a current control means 23 determines a first phase-voltage command V1* and a second phase-voltage command V2*, according to a total required torque-current value Iqsum* that is equivalent to a motor-torque target value; phase-current detection values of the respective motor phases; and the motor rotation angle signal θ.

A first switching-element driving circuit 24 performs PWM modulation on the first phase-voltage command V1*, to thereby instruct a first inverter 21 to cause switching operation. Upon receiving a switching operation signal from the first switching-element driving circuit 24, the first inverter 21 performs chopper control on switching elements UP1, VP1, WP1, UN1, VN1 and WN1, to cause currents to flow through the respective motor phases U1, V1 and W1 by means of power supplied from the power source 4.

With respect also to a second switching-element driving circuit 25 and a second inverter 22, similarly, currents are caused to flow through the respective motor phases U2, V2 and W2 according to the second phase-voltage command V2*.

Note that the first and second inverters 21,22 are provided as corresponding to the first and second sets of windings 15,16, respectively.

Figure 2:
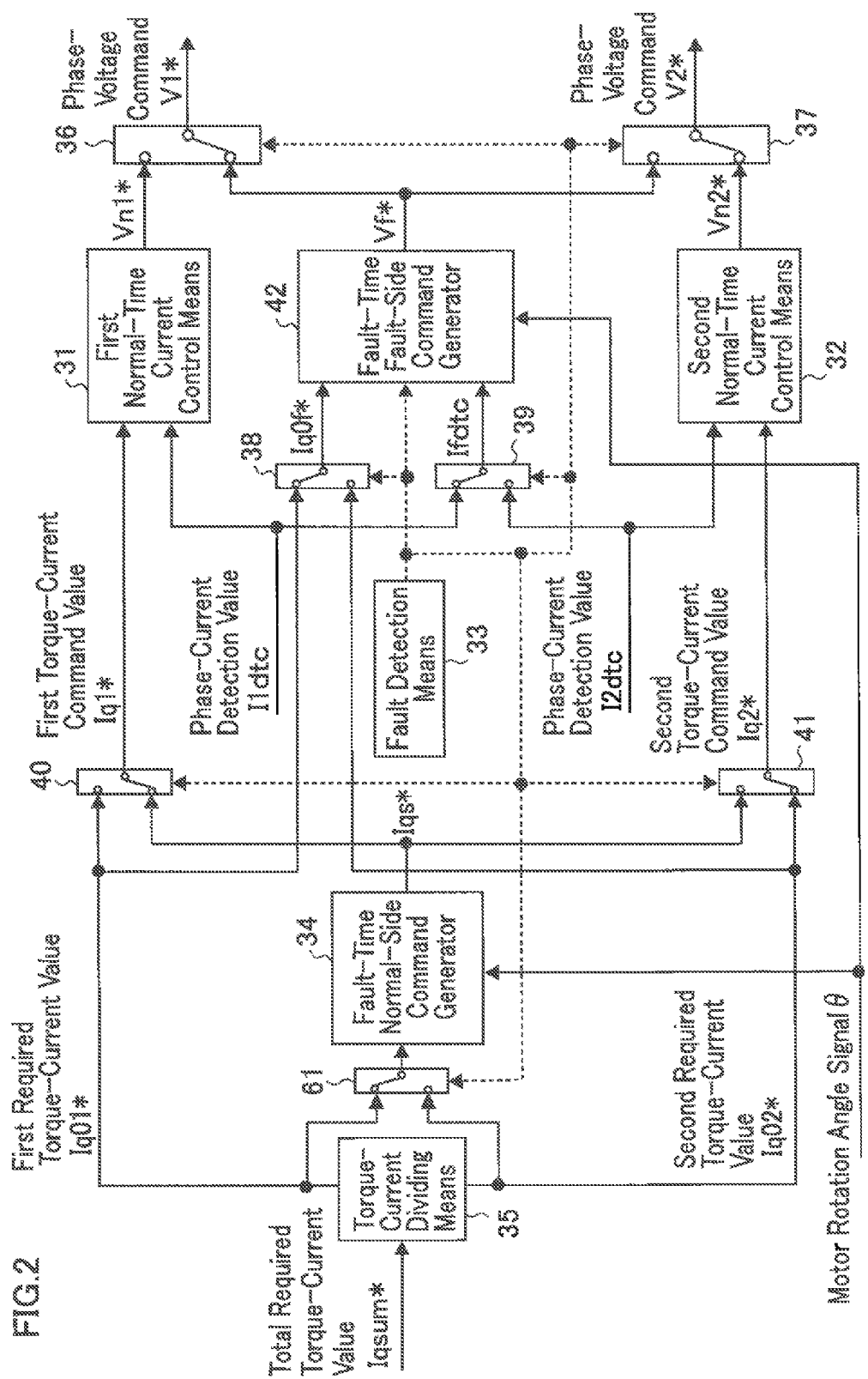
FIG. 2 is a diagram showing a configuration of a current control means according to Embodiment 1.

FIG. 2 is a block diagram showing a configuration of the current control means 23 according to Embodiment 1.

The configuration and operation of the current control means 23 will be described using FIG. 2.

The current control means 23 includes a first normal-time current control means 31 and a second normal-time current control means 32 which execute a normal control mode used at normal time, and a fault-time current control means 30 (not shown in the figure) which is used at fault time, and further includes a fault detection means 33 and switching means 36,37.

Here, the two types of control means (that is, the first and second normal-time current control means and the fault-time current control means) are switchable therebetween so that, among the two systems (first system and second system) each being the combination of the winding sets and the inverter (hereinafter, each called also as a winding activation system), the winding activation system in the fault occurrence side can be controlled by using the fault-time current control means 30.

Note that the fault-time current control means 30 (not shown in the figure) is configured with a fault-time normal-side command generator 34 and a fault-time fault-side command generator 42.

The total required torque-current value Iqsum* is divided by a torque-current dividing means 35 into a first required torque-current value Iq01* and a second required torque-current value Iq02* which are required values of torques to be generated, respectively, in the first winding activation system and the second winding activation system.

In this embodiment, the first required torque-current value Iq01* and the second required torque-current value Iq02* are each set to a half value of the total required torque-current value Iqsum*.

That is, such settings are provided here that cause the respective systems to generate equal torques so that the output torque is obtained as a sum of them.

Then, at normal time when no fault occurs, the first required torque-current value Iq01* is selected as a first torque-current command value Iq1* at a switching means 40. An operation at fault time will be described later.

Also in the second system, similarly, the second required torque-current value Iq02* is selected as a second torque-current command value Iq2* at a switching means 41.

Then, the first normal-time current control means 31 outputs a normal-time phase-voltage command Vn1* on the basis of the first torque-current command value Iq1* and the phase-current detection value I1dtc.

At normal time, the normal-time phase-voltage command Vn1* is selected at the switching means 36, which is then input as the first phase-voltage command V1* to the first switching-element driving circuit 24 (see, FIG. 1).

The first and second normal-time current control means 31,32 perform a so-called dq control, i.e. a two-axis control from three-phase. The first torque-current command value Iq1* is used for the dq control as a q-axis current command.

It is noted that, in FIG. 2, no wiring is shown for inputting the motor rotation angle signal θ to the first normal-time current control means 31 and the second normal-time current control means 32; however, wirings may be provided so that the motor rotation angle signal θ is input to the first normal-time current control means 31 and the second normal-time current control means 32, in order to be used for coordinate transformation normally performed in the dq control.

Here, a q-axis current is a current component that is proportional to the torque, which is called also as a torque current in the description of this embodiment. With respect to another one i.e. a d-axis current that controls field magnetic flux, although it is controlled to be zero in this embodiment, another value may be applied thereto.

Meanwhile, at normal time, with respect also to the second system, similarly, a dq control is performed by the second normal-time current control means 32 on the basis of the second torque-current command value Iq2*, so that the normal-time phase-voltage command Vn2* is input as the second phase-voltage command V2* to the second switching-element driving circuit 25 (see, FIG. 1).

In such a way, at normal time, torque currents in the first and second winding activation systems are established in a manner following the first and second required torque-current values, respectively, so that an intended output torque can be obtained.

Next, the fault detection means 33 will be described. It suffices that the fault detection means 33 is configured with an abnormality detection means that utilizes the phase-current detection value to detect normality/abnormality of the inverter or the motor, and with a short-circuit place determination means that determines a short circuited place.

According to this configuration, in the fault detection means 33, the short-circuit place determination means determines a place at which a short-circuit fault occurs, when a some kind of abnormality is determined to occur in the inverter or the motor.

The short-circuit place determination means has stored therein test patterns indicative of predetermined combinations of the switching elements to be turned ON in the first inverter 21 and the second inverter 22, and determines the switching element that causes a short-circuit fault or the phase that causes an earth short-circuit fault or a voltage short-circuit fault, on the basis of an average voltage at a terminal of the motor, the test patterns and the detection currents flowing through respective phases in response to execution of that patterns.

In such a way, when a fault occurs, the fault detection means 33 outputs a fault-system determination result indicating whether the fault is in the first winding activation system or in the second winding activation system, and a short-circuit place determination result indicating, in the winding activation system, which switching element a short-circuit fault occurred in, which phase an earth short-circuit fault or a voltage short-circuit fault occurred in, which interphase a short-circuit fault occurred in, or the like.

Figure 3:
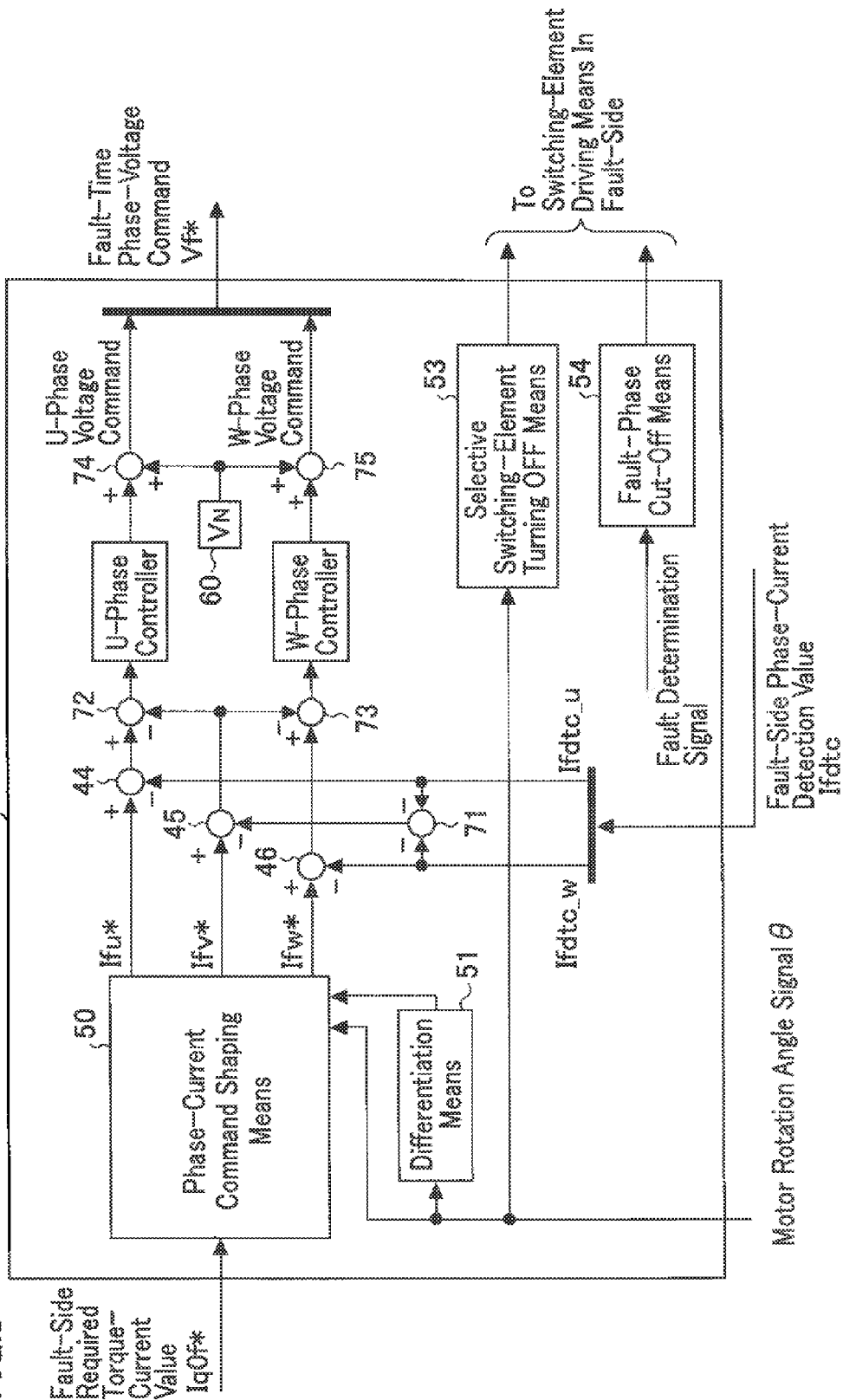
FIG. 3 is a diagram showing a configuration of a fault-time fault-side command generator according to Embodiment 1.
Figure 4:
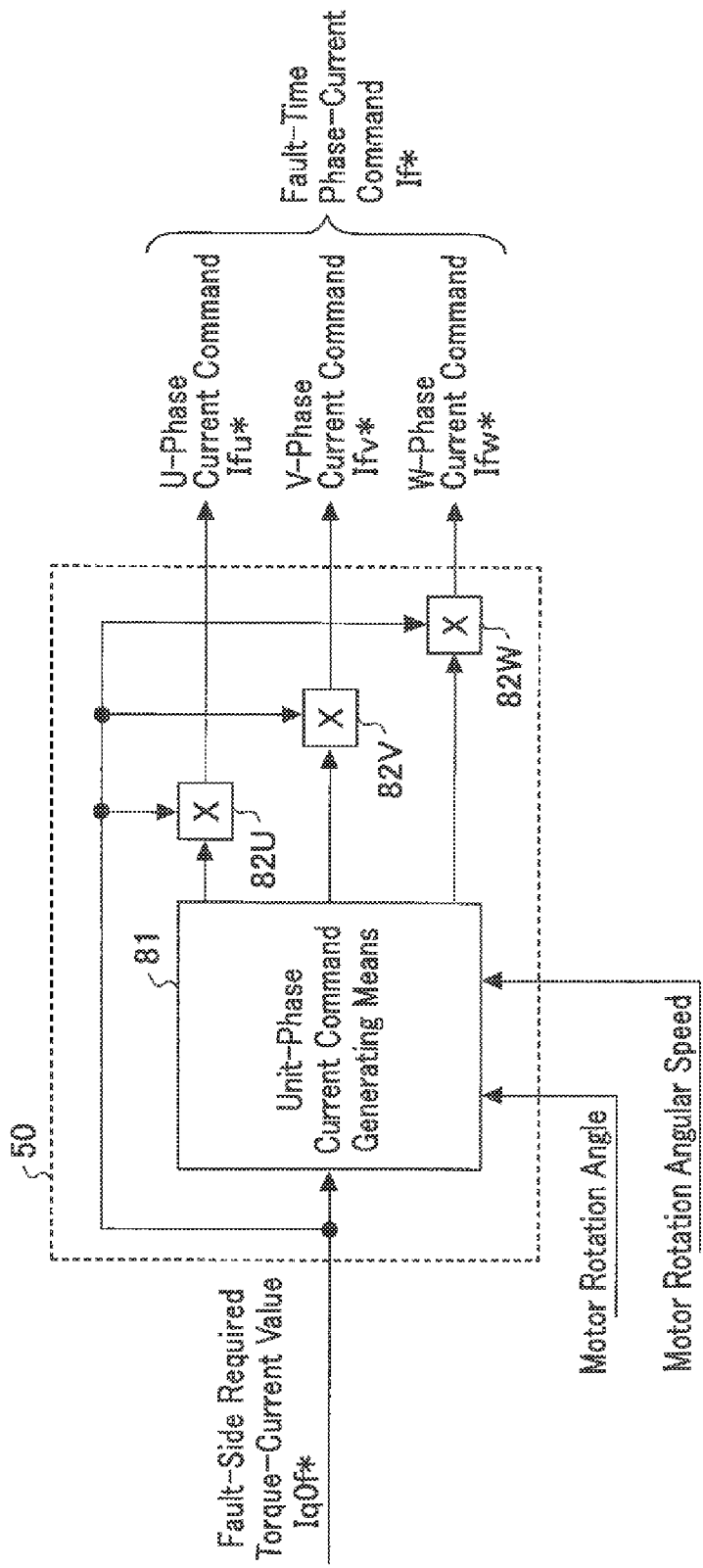
FIG. 4 is a diagram showing a configuration of a phase-current command shaping means according to Embodiment 1.

FIG. 3 is a block diagram showing a configuration of the fault-time fault-side command generator 42 according to Embodiment 1, and FIG. 4 is a block diagram showing a configuration of a phase-current command shaping means 50 indicated in FIG. 3.

Detailed operations of the fault-time fault-side command generator 42 and the phase-current command shaping means 50 will be described later.

Next, an outline of operation at the occurrence of a fault will be described.

Figure 5:
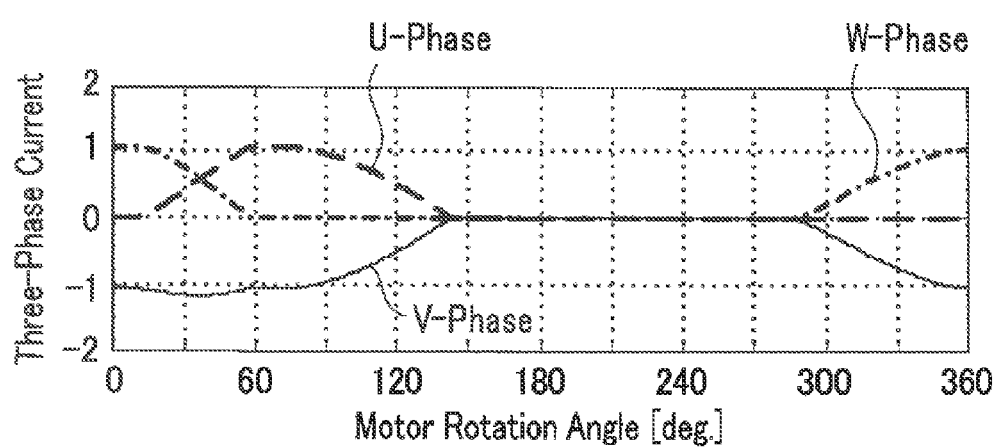
FIG. 5 is graphs showing an example of waveforms of currents flowing due to induced voltages and a brake torque, when a control is suspended in the case where a V-phase switching element causes a short-circuit fault or a V-phase causes an earth short-circuit fault.
Figure 5:
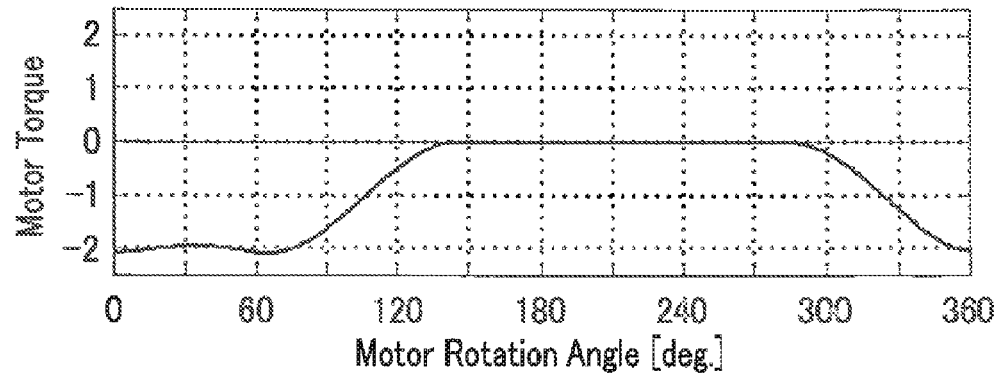

FIG. 5 is graphs showing an example of current waveforms flowing due to induced voltages (waveforms of three-phase currents) and a brake torque (motor torque), when a control is suspended in the case where a V-phase switching element causes a short-circuit fault or a V-phase causes an earth short-circuit fault.

Now, let's assume that a short-circuit fault occurs in the first winding activation system. If no control is given, namely, the switching elements in the fault side other than the switching element causing a short-circuit fault, are turned OFF, a brake torque occurs over half of the rotation angle as shown in FIG. 5(*b*).

Meanwhile, with respect to the second winding activation system in the normal side, the fault-time normal-side command generator 34 generates a torque current command calculated by adding a reverse-direction torque against the direction of the brake torque, to the second required torque-current value for the normal side i.e. a normal-time torque-current command, in a phase range where the brake torque due to the fault phase in the fault side is not generated.

The thus-generated command is provided as the second torque-current command value Iq2* which is an input for the second normal-time current control means 32. The normal-time phase-voltage command Vn2*, which is an output of the second normal-time current control means 32, is given as the phase-voltage command V2* to the winding activation system in the normal side.

Next, an operation when a short-circuit occurs in the first winding activation system will be described using FIG. 2.

Depending on the fault-system determination result obtained by the fault detection means 33, the first required torque-current value Iq01* in the fault side is selected by a switching means 38, which is then input as a fault-side required torque-current value Iq0f* to the fault-time fault-side command generator 42.

Further, the phase-current detection value I1dtc is selected at a switching means 39, which is then input as a fault-side phase-current detection value Ifdtc to the fault-time fault-side command generator 42.

Furthermore, the short-circuit place determination result obtained by the fault detection means 33, and the motor rotation angle θ are input to the fault-time fault-side command generator 42, so that the switching elements in the fault side other than the switching element causing a short-circuit fault, are set to OFF by a selective switching-element turning OFF means 53 (see, FIG. 3).

A fault-time phase-voltage command Vf* calculated by the fault-time fault-side command generator 42 is selected by the switching means 36, which is then output as the first phase-voltage command V1*.

Meanwhile, the second required torque-current value Iq02* in the normal side is selected by a switching means 61, which is then input to the fault-time normal-side command generator 34 resulting in generating a torque-current command matched with the content of the fault. An operation of the fault-time normal-side command generator 34 will be described later.

The command generated by the fault-time normal-side command generator 34 is output as a normal-side torque-current command value Iqs*.

Then, at the switching means 41, the normal-side torque-current command value Iqs* is input as the second torque-current command value Iq2* to the second normal-time current controlling means 32.

Further, the second phase-voltage command Vf* calculated by the second normal-time current controlling means 32 is selected by the switching means 37, which is then output as the second phase-voltage command V2*.

In the followings, an operation of Embodiment 1 will be described citing a case where the lower side switching element VN1 in the V1 phase of the first winding activation system, causes a short-circuit fault.

An operation of the fault-time normal-side command generator 34 will be described using FIG. 3.

Note that details of a unit-phase current command generating means 81 (see, FIG. 4) provided in the phase-current command shaping means 50, will be described later.

The configuration of the fault-time normal-side command generator 34 shown in FIG. 3 comprises a control structure suitable for a case where the switching element VN1 causes a short-circuit fault, the operation of which is similar to that of the conventional device described in Patent Document 1.

The phase-current command shaping means 50 outputs fault-time phase-current commands Ifu*, Ifv* and Ifw* on the basis of the fault-side required torque-current value Iq0f* and signals of the motor rotation angle θ and its differential i.e. a motor rotation angular speed.

Based on these, the fault-time phase-voltage command Vf* is generated by the control components placed in the fault-time fault-side command generator 42 but after the phase-current command shaping means 50.

Meanwhile, in the rotation angle range where it is unable to generate a positive torque, all switching elements in the fault-side inverter are temporarily turned OFF by the selective switching-element turning OFF means 53, to thereby suppress the brake torque due to a current generated by an induced voltage and passing through the short-circuit path.

As shown in FIG. 4, the phase-current command shaping means 50 generates phase-current commands for the respective phases, depending on the motor rotation angle, the motor rotation angular speed obtained by a differentiation means 51 (see, FIG. 3) for that angle, and the fault-side required torque-current value Iq0f*.

Specifically, using a unit-phase current command generating means 81 (see, FIG. 4), the phase-current command shaping means generates unit-phase-current commands for the respective phases on the basis of the fault-side required torque-current value, a signal of the motor rotation angle θ and a signal of the motor rotation angular speed. Then, by multiplying these (that is, unit-phase current commands for the respective phases) by the fault-side required torque-current value Iq0f* using multipliers 82U, 82V, and 82W, the phase-current command shaping means outputs the fault-time phase-current commands Ifu*, Ifv* and Ifw*.

Here, fault-side settings when the switching element VN1 causes a short-circuit fault, will be described using FIG. 6 and FIG. 7.

Figure 6:
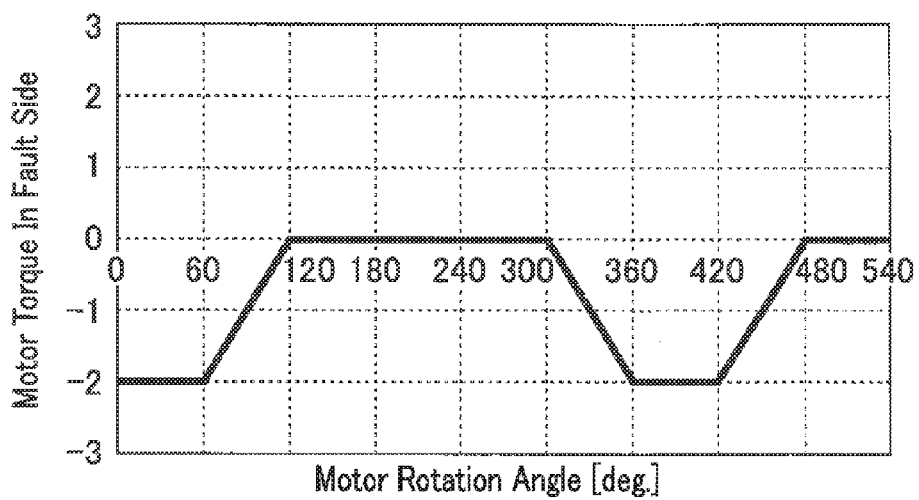
FIG. 6 is graphs showing waveform examples of motor torques in the fault side and in the normal side, and a total of them, according to Embodiment 1.
Figure 6:
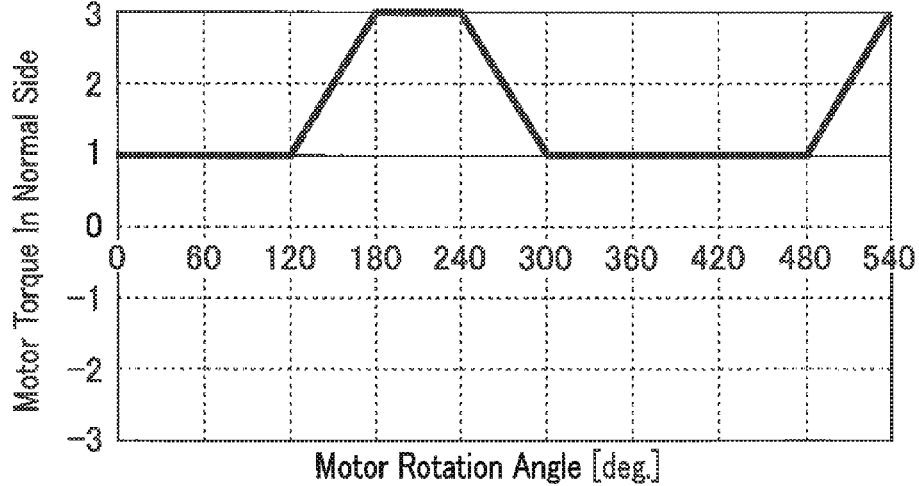
Figure 6:
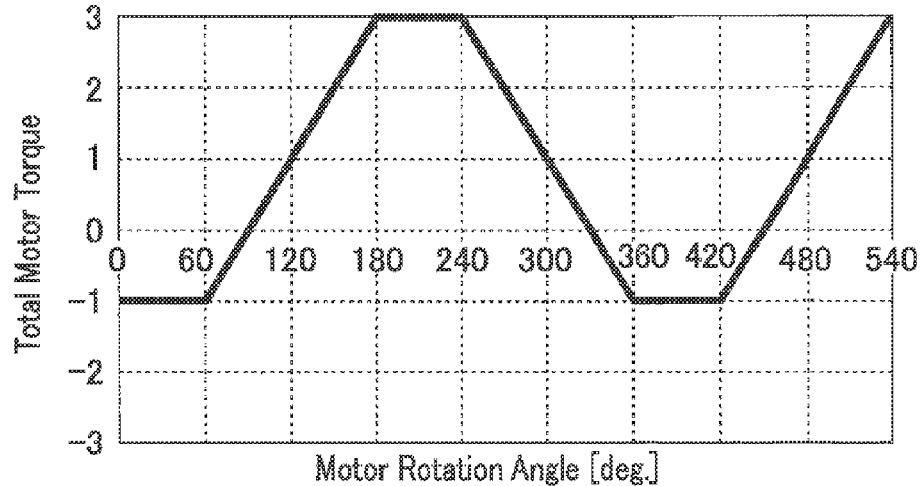
Figure 7:
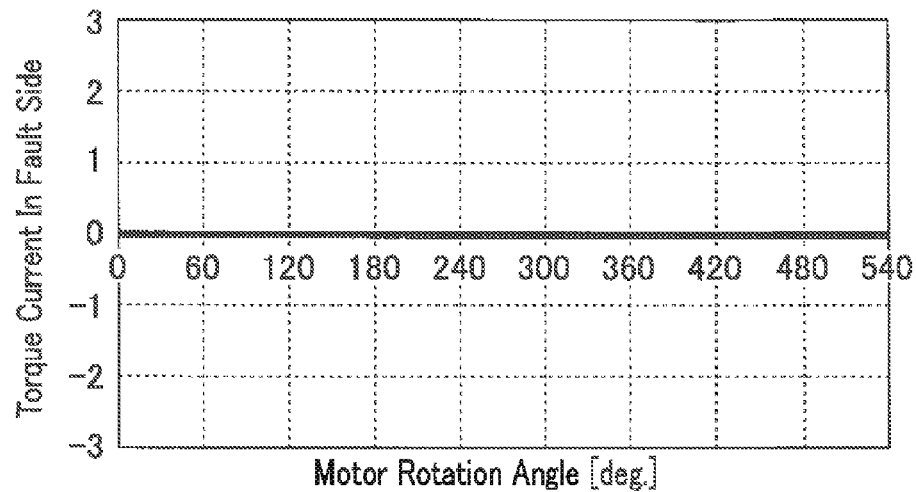
FIG. 7 is graphs showing waveform examples of torque currents in the fault side and in the normal side, according to Embodiment 1.
Figure 7:
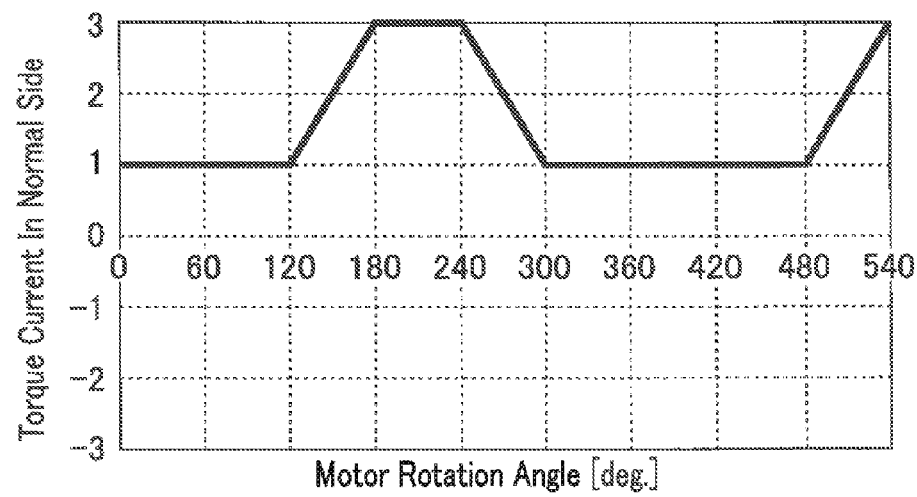

Here, FIG. 6 is graphs showing an example of waveforms of motor torques in the fault side and in the normal side, and a total of them, according to Embodiment 1, and FIG. 7 is graphs showing an example of waveforms of torque currents in the fault side and in the normal side, according to Embodiment 1.

When the switching element VN1 causes a short-circuit, the V-phase is short-circuited to a negative potential of the power source. Since no control is made on the torque generated in the fault side, the switching elements UP1, VP1, WP1, UN1 and WN1 other than VN1, are turned OFF by the selective switching-element turning OFF means 53.

As a result, the motor torque in the fault side becomes like FIG. 6(a).

A range where the motor torque has a negative value is a brake-torque generating range due to the short-circuited VN1, and with respect to the torque current, it suffice to give a zero command like FIG. 7(a).

Meanwhile, with respect to the normal side, in order to produce a torque-ripple waveform that allows the user to recognize the fault, the motor torque like FIG. 6(b) is output. In the phase range where the brake torque due to the fault phase in the fault side is not generated, a reverse-direction torque against the direction of the brake torque is being added. At this time, with respect to the torque current in the normal side, it suffices to give an instruction that causes the torque current to be like FIG. 7(b).

As a result, a waveform of the total motor torque becomes like FIG. 6(c). By adding the reverse-direction torque, a larger amplitude can be achieved in comparison with an amplitude of a torque ripple produced solely by the brake torque.

Here, modified examples of Embodiment 1 will be described.

Figure 8:
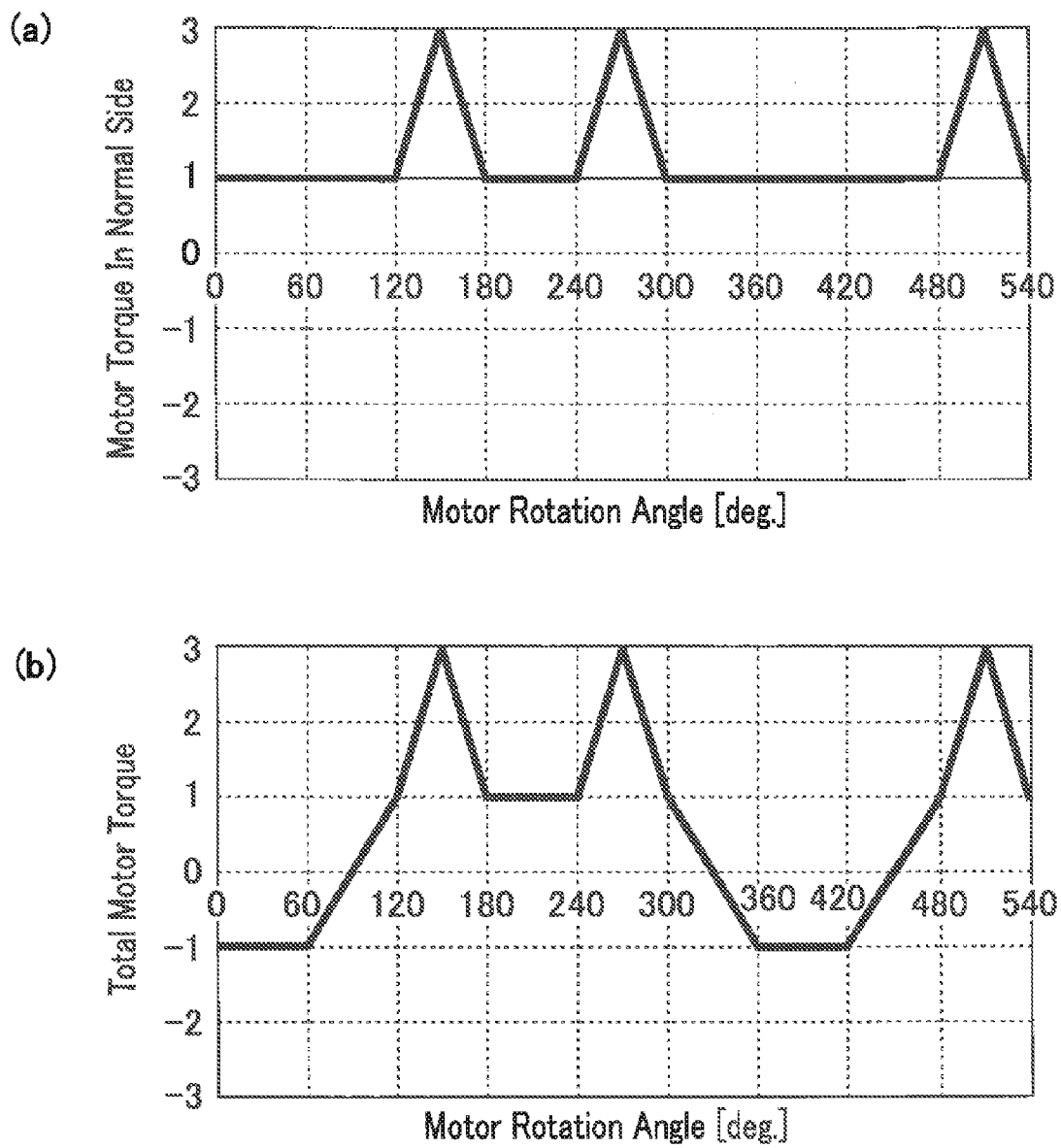
FIG. 8 is graphs showing waveform examples of motor torques in the fault side and in the normal side, according to a modified example of Embodiment 1.
Figure 9:
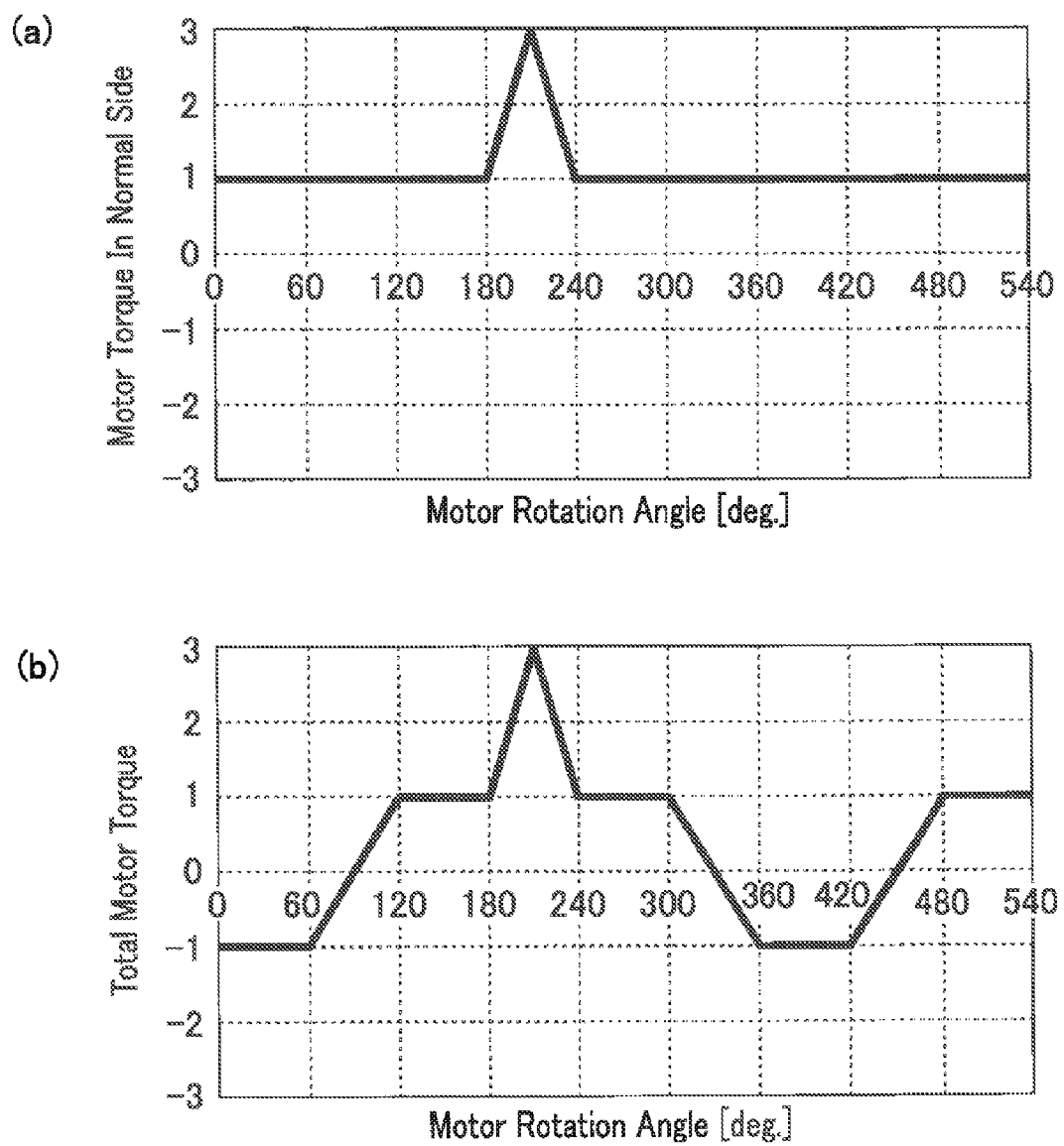
FIG. 9 is graphs showing waveform examples of motor torques in the fault side and in the normal side, according to another modified example of Embodiment 1.

In the above case, the motor torque is output that is calculated by adding, in the normal side and over all of phase range where the brake torque due to the fault phase in the fault side is not generated, a reverse-direction torque against the direction of the brake torque; however, since it is enough to provide a torque ripple that prompts the user to recognize the fault, the waveform may be like FIG. 8 or FIG. 9.

FIG. 8 is graphs each showing a waveform when a motor torque is output that is calculated by adding, in the normal side and in a phase range which is adjacent to a phase range where the brake torque due to the fault phase in the fault side is not generated, a reverse-direction torque against the direction of the brake torque, in which an output waveform in the normal side is shown in FIG. 8(a) and a total-output waveform is shown in FIG. 8(b).

Further, FIG. 9 is graphs each showing a waveform when a motor torque is output that is calculated by adding, in the normal side and in a phase range which is not adjacent to a phase range where the brake torque due to the fault phase in the fault side is not generated, a reverse-direction torque against the direction of the brake torque, in which a normal-side torque waveform is shown in FIG. 9(a) and a total torque waveform is shown in FIG. 9(b).

Reading each vertical scale in FIG. 8 and FIG. 9 into torque-current command values results in a torque-current waveform.

Here, summarized effects by the foregoing motor control devices according to Embodiment 1 will be described.

At the time of controlling the motor including plural sets of windings, when the fault detection means detects a short-circuit fault, the current control device can cause the user to recognize the fault by means of a torque ripple which is obtained by determining the phase range where the brake torque is generated, according to the fault-time voltage command matched with the content of the fault and output from the fault-time current control means, and then emphasizing in that range the control of the inverter in the normal side by the normal-time current control means.

Moreover, by setting the fault-side brake torque and the normal-side added torque to be equal, it is possible to achieve an output that is nearly equal in time average to the output torque at normal time.

As described above, the motor control device according to Embodiment 1 is the motor control device 10 which controls the motor 5 including the plural sets of windings 15,16, comprising:

the plurality of inverters 21,22 each having switching elements for respective phases of each of the plural sets of windings, which control voltages applied to the respective phases; the current control means 23 which controls currents caused to flow the plural sets of windings, by giving to each of the inverters 21,22, voltage commands V1*, V2* corresponding to the voltages applied to the respective phases, according to a total required torque-current value Iqsum* that is equivalent to a target value of a torque to be generated by the motor 5; and the fault detection means 33 which detects a short-circuit fault in the switching elements, or an earth short-circuit or voltage short-circuit fault in the inverters 21,22 or the plural sets of windings;

wherein the current control means 23 has the normal-time current control means 31,32 which are used at normal time so as to control, respectively, the currents caused to flow the plural sets of windings, and the fault-time current control means 30 (namely, the combination of the fault-time normal-side command generator 34 and the fault-time fault-side command generator 42) which generates a fault-time voltage command according to the content of the fault detected by the fault detection means 33; and wherein, when the fault detection means 33 detects the fault, the current control means continues controlling the inverter in the normal side by the normal-time current control means 31,32 while continuing controlling the inverter in the fault side by the fault-time voltage command generated by the fault-time current control means 30, to thereby emphasis the torque ripple.

Thus, when the fault detection means detects the fault, since the current controlling means continues controlling the inverter in the normal side by the normal-time current control means while continuing controlling the inverter in the fault side by the fault-time voltage command, it is possible to produce a torque ripple larger than the brake torque generated by the short-circuit fault, to thereby cause the user to surely recognize the occurrence of the fault.

Meanwhile, the fault-time current control means 30 of the motor control device according to Embodiment 1 uses the phase without fault in the fault side and at least one of the respective phases in the normal side, to generate a torque calculated by adding, to the motor torque to be generated at normal time and in the phase range where the brake torque due to the fault phase is not generated, a reverse-direction torque against the direction of the brake torque.

Thus, the user can recognizes the fault by an uncomfortable feeling caused by the torque ripple produced due to a torque difference between the brake torque and the reverse-direction torque having been added.

Meanwhile, the fault-time current control means 30 causes a total torque of the output torque in the normal side and the output torque in the fault side, to be nearly equal in time average to the output torque at normal time.

Thus, the user can get an assist torque equivalent in average to that at normal time, as well as can recognize the fault by an uncomfortable feeling due to the torque ripple.

Meanwhile, the fault-time current control means 30 generates the torque calculated by adding the reverse-direction torque against the direction of the brake torque, in the phase range where the brake torque due to the fault phase is not generated.

Thus, the user can recognize the fault by an uncomfortable feeling caused by a torque gap.

Meanwhile, the fault-time current control means 30 generates the torque calculated by adding the reverse-direction torque against the direction of the brake torque in the phase range, said phase range being adjacent to the phase range where the brake torque is generated.

Alternatively, the fault-time current control means 30 generates the torque calculated by adding the reverse-direction torque against the direction of the brake torque in the phase range, said phase range being not adjacent to the phase range where the brake torque is generated.

Thus, the user can recognize the fault by an uncomfortable feeling caused by a torque gap.

Embodiment 2

In the foregoing Embodiment 1, the reverse-direction torque against the direction of the brake torque of the fault side is added in the normal side, whereas in Embodiment 2, such an intended torque can be added by controlling two phases other than the fault phase in the fault side.

As described previously, in Embodiment 1, when the switching element in the fault side is turned OFF, the motor torque has the waveforms shown in FIG. 6(a), and the torque-current command at that time becomes FIG. 7(a).

Here, description is made to a current and a torque that can be generated by the fault-side winding activation system, when the rotation is suspended in the case where the switching element VN1 causes a short-circuit fault. When the switching element VN1 causes a short-circuit, the V-phase is short-circuited to a negative potential of the power source. Thus, it is unable to generate a positive torque in the rotation-angle range where a larger positive-side current should have to flow in the V-phase than in the other phases.

How to specifically set the output torque and the torque-current command in that case will be described.

Note that the operation other than this portion is similar to that in Embodiment 1, so that its description is omitted here.

Figure 10:
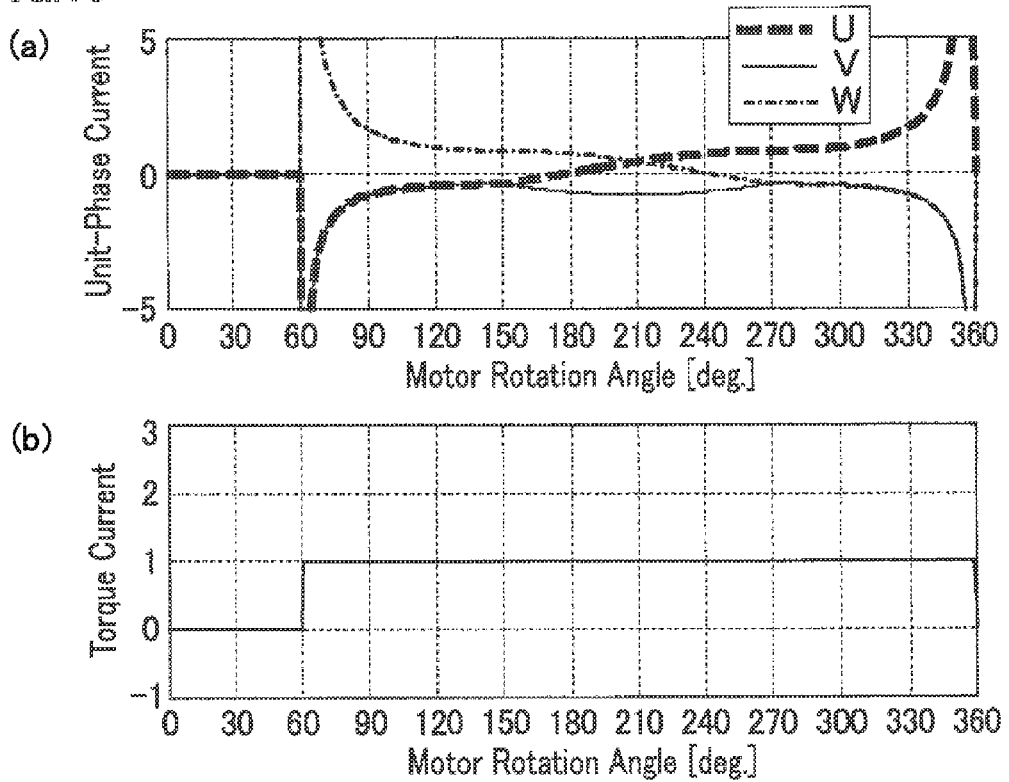
FIG. 10 is graphs showing a theoretically achievable limit of motor torque and phase-current waveforms at that torque, in the case where a V-phase switching element causes a short-circuit fault or a V-phase causes an earth short-circuit fault.

FIG. 10 shows a torque-current waveform (FIG. 10(b)) which can be generated theoretically when the torque current is required to be 1, and unit-phase current waveforms (FIG. 10(a)) which achieve that waveform.

As shown in FIG. 10(b), in the range of rotation angle from 0 degree to 60 degrees, it is unable to generate a torque. Rather, there is a possibility that a brake torque is generated by induced voltages if the motor is caused to rotate by an external force. In this rotation angle range, the switching elements are temporarily turned OFF by the selective switching-element turning OFF means 53, to decrease current paths thereby reducing the brake torque.

Figure 11:
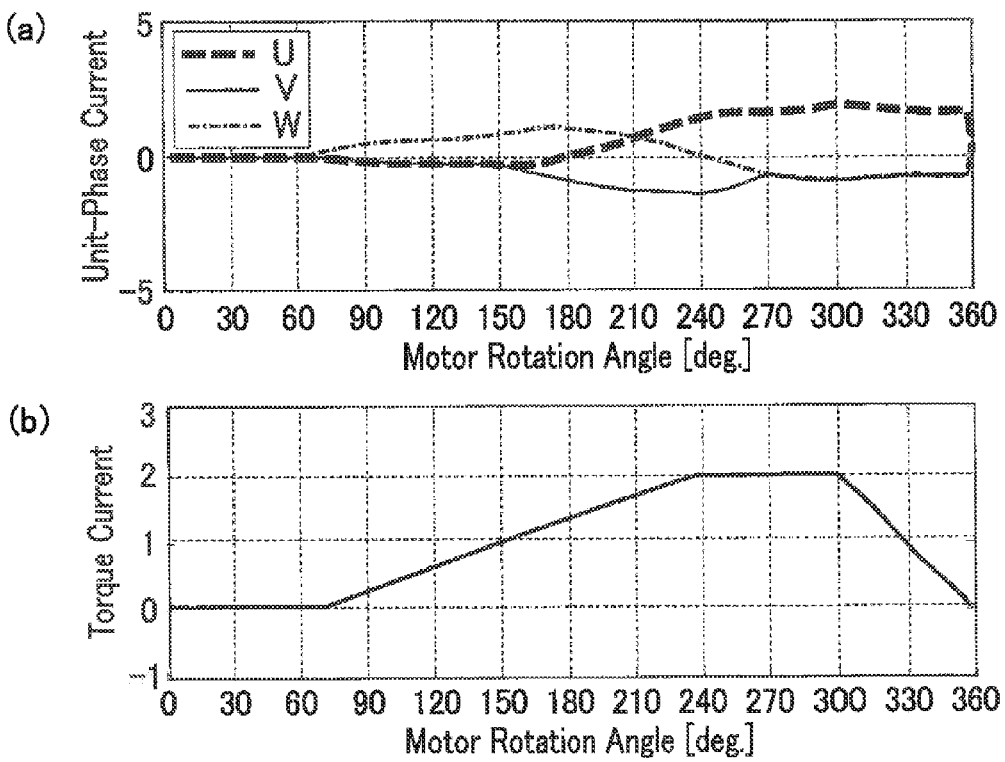
FIG. 11 is waveform graphs showing a relationship between a unit phase current and a torque current, according to Embodiment 2.

FIG. 11 is waveform graphs showing a relationship between a unit phase current and a torque current, according to Embodiment 2.

Here, a basic operation of the phase-current command shaping means 50 according to Embodiment 2 will be described using FIG. 11.

In order that the torque current required to be output from the fault side has, for example, a waveform of FIG. 11(b) so as to achieve the torque current rising to the right until the motor rotation angle is approx. 240 degrees, the unit-phase currents become that having large absolute values in right side as shown in FIG. 11(a).

This is because the unit-phase currents to achieve a torque current of 1 are shown at FIG. 10(a), and multiplying this currents at every rotation angle by the "required torque current" having the shape shown in FIG. 11(b), results in the unit-phase currents as shown in FIG. 11(a).

Thus, once a waveform of the torque current is determined, it is possible using the relationship of FIG. 10 to pre-prepare, as a table, unit-phase current commands for every rotation angle.

In such a way, patterns of necessary unit-phase current commands may be prepared as a table in the unit-phase current command generating means 81 (see, FIG. 4).

It is noted that, there is another way of not preparing the unit-phase current commands as a table. A similar effect is achieved also by such a configuration in which the torque-current waveform is prepared as a table and the relationship between the torque-current waveform and the unit-phase current command of FIG. 11 is prepared as a table, so that the given torque-current waveform is successively transformed to each unit-phase current command using the relationship of FIG. 10.

Further, the table may be expressed instead by a mathematical function of a formula depending on the motor rotation angle.

In particular, the unit-phase currents in FIG. 10 can be expressed by a mathematical function comprising a combination of a sine and a cosine and their inverses i.e. a cosecant and a secant.

By using the unit-phase current commands, it becomes possible to produce the torque ripple in the fault side.

Figure 12:
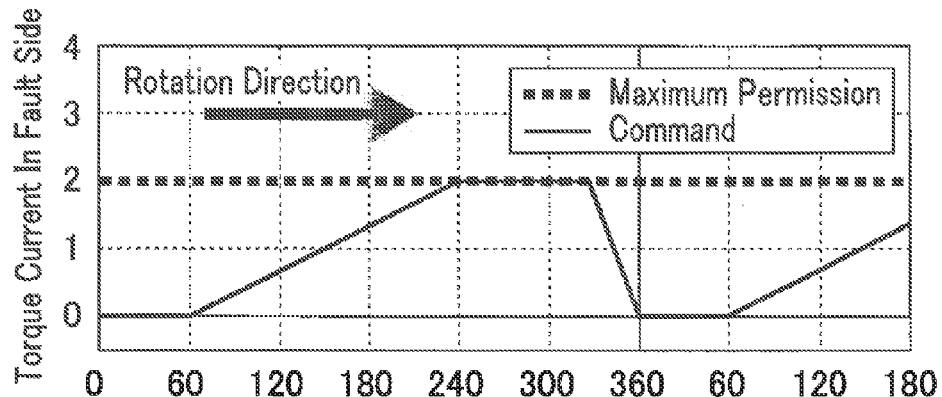
FIG. 12 is graphs showing waveform examples of torque currents when an amplitude of a torque in the fault side is increased by adding thereto a reverse-direction torque against the direction of a brake torque, according to Embodiment 2.
Figure 12:
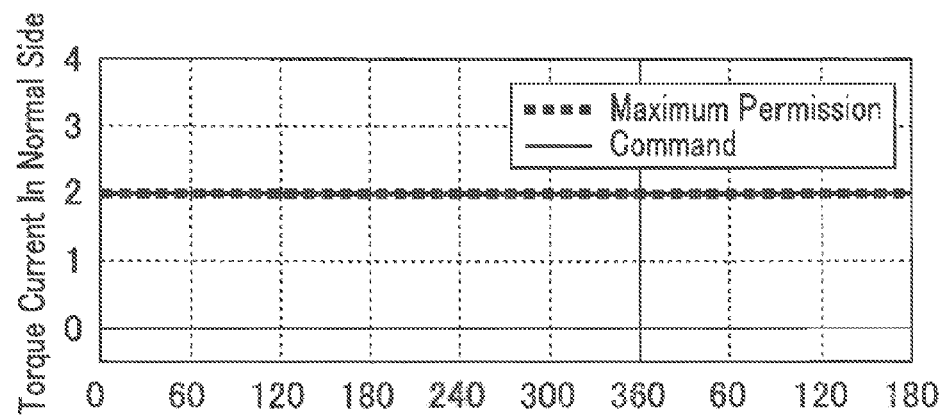
Figure 12:
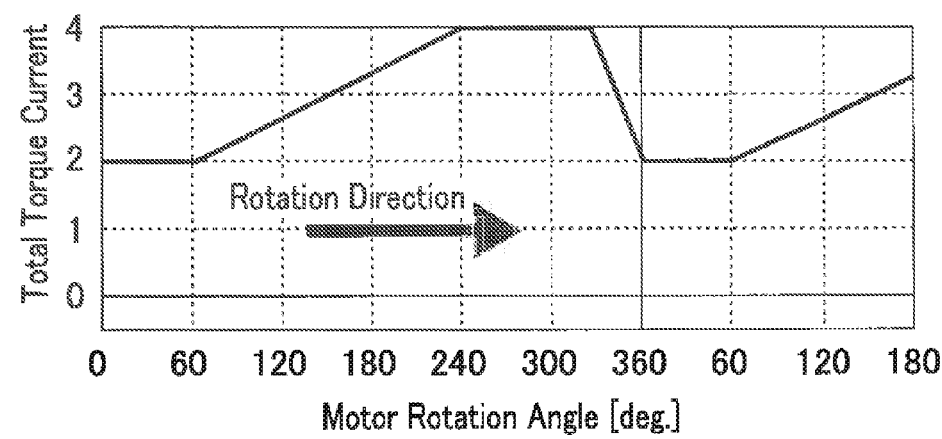

FIG. 12 is graphs showing an example of waveforms of torque currents when an amplitude of a torque in the fault side is increased by adding thereto a reverse-direction torque against the direction of the brake torque, according to Embodiment 2.

For example, the torque current in the fault side is set according to the command indicated on a solid line in FIG. 12(a), and the torque current in the normal side is set according to the command on a solid line in FIG. 12(b). Here, the total required torque-current value is given as 3 and the maximum permissible current is given as 2.

In FIG. 12(a), based on the rotational direction of the motor, the torque current is set to become larger as the rotation angle becomes closer to the rotation angle range of from 0 degree to 60 degrees where torque insufficiency emerges in the fault side.

In contrast, in the normal side, regardless of the rotation angle, the torque current is set to be 2 that is equal to the maximum permissible current as in FIG. 12(b). Note that FIG. 12(b) shows a case where the rotation direction is a forward direction with respect to the motor rotation angle, and in the case of reverse rotation, the waveform becomes that transcribed therefrom so as to be left-right symmetric at the degree of 30.

When the reverse-direction torque against the direction of the brake torque is thus added in the fault side, a total torque current of the normal side and the fault side becomes that shown in FIG. 12(c), and hence the torque current is set so that the total value of the torque to be generated in the normal side and the torque to be generated in the fault side becomes larger as the rotation angle becomes closer to the rotation angle range where torque insufficiency emerges in the fault side.

Thus, the torque becomes larger as the angle becomes closer to the rotation angle range where torque insufficiency emerges due to the generation of the brake torque in the fault side. Accordingly, the rotation of the motor is accelerated thereby making it possible to speedily exit the range of torque insufficiency, and thus the staying time in the range of torque insufficiency becomes short, so that it becomes possible to achieve a sufficient output torque by reducing an influence of torque insufficiency.

As described above, the fault-time current control means 30 of the motor control device according to Embodiment 2, adds in the fault side the reverse-direction torque against the direction of the brake torque, and sets a total value of the torque to be generated in the normal side and the torque to be generated in the fault side so that the total value becomes larger as the rotation angle of the motor 5 becomes closer to the rotation angle range where torque insufficiency emerges in the fault side.

This causes the torque to becomes larger as the angle becomes closer to the rotation angle range where torque insufficiency emerges due to the generation of the brake torque in the fault side. Accordingly, the rotation of the motor is accelerated thereby making it possible to speedily exit the range of torque insufficiency, so that it becomes possible to achieve a sufficient output torque by reducing an influence of torque insufficiency.

Further, according to the configuration of Embodiment 2, since the torque ripple is produced solely in the fault side and a similar control to that in normal time is made in the normal side, it becomes unnecessary to prepare an additional fault-time normal-side control.

Embodiment 3

In the foregoing Embodiment 1, the intended torque is added solely in the normal side, and in the foregoing Embodiment 2, the intended torque is added solely in the fault side; however, it is possible to add these intended torques both in the normal side and the fault side.

That is, in Embodiment 3, the intended torques are added both in the normal side and the fault side, so that an uncomfortable feeling cause by the torque gap is enhanced, thereby making it possible to surely recognize the fault.

Embodiment 4

In the foregoing Embodiment 1, the intended torque is added solely in the normal side, in Embodiment 2, the intended torque is added solely in the fault side, and in Embodiment 3, the intended torques are added both in the normal side and the fault side; however, it is possible to emphasize the torque ripple also by subtracting a torque in the normal side when a fault-side brake torque is generated.

How to specifically set the output torque and the torque-current command in that case will be described.

Note that the operation other than this portion is similar to that in Embodiment 1, so that its description is omitted here.

Figure 13:
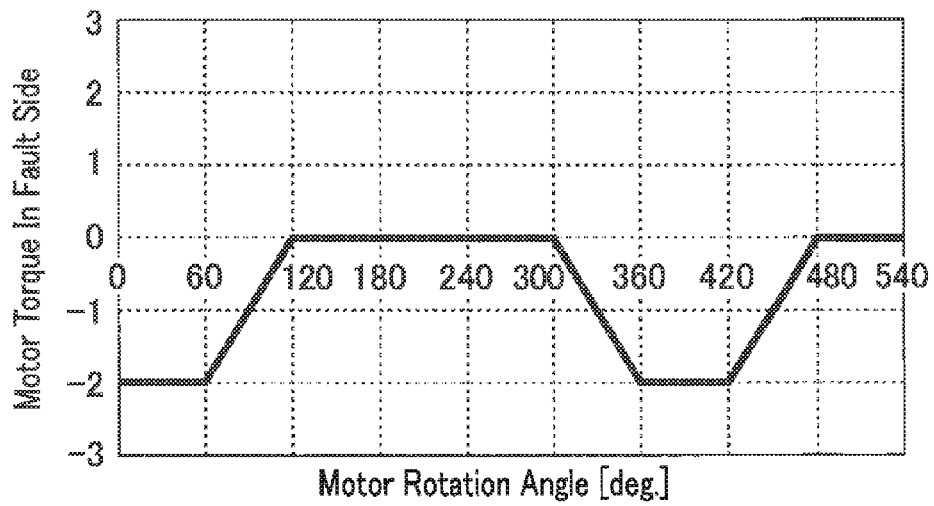
FIG. 13 is graphs showing waveform examples of motor torques in the fault side and in the normal side, and a total of them, according to Embodiment 4.
Figure 13:
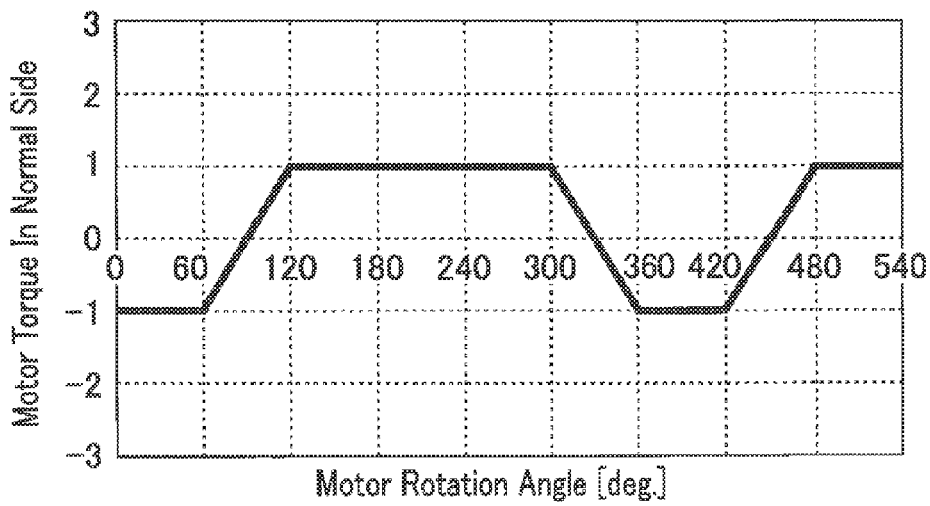
Figure 13:
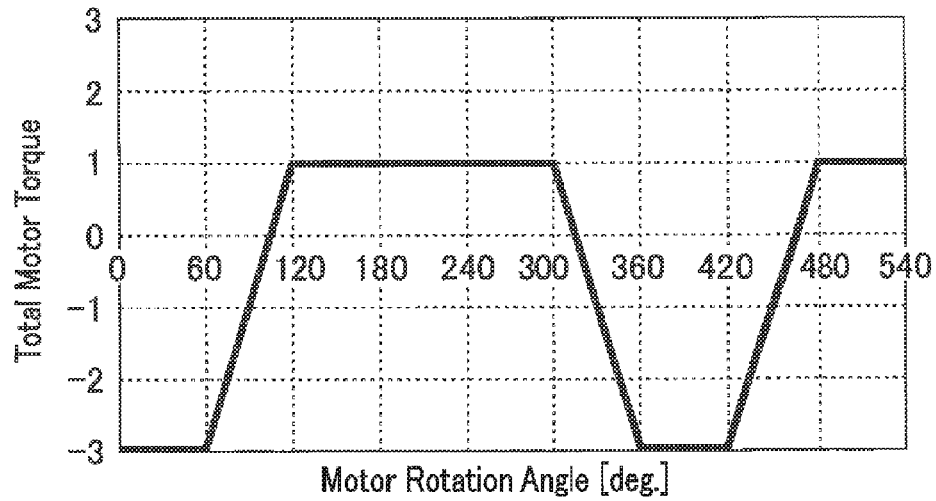
Figure 14:
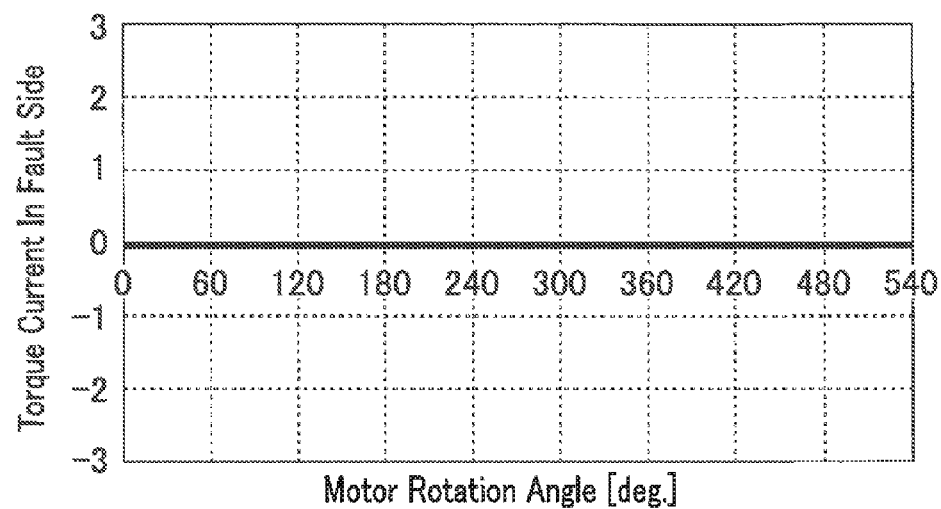
FIG. 14 is graphs showing waveform examples of torque currents in the fault side and in the normal side, according to Embodiment 4.
Figure 14:
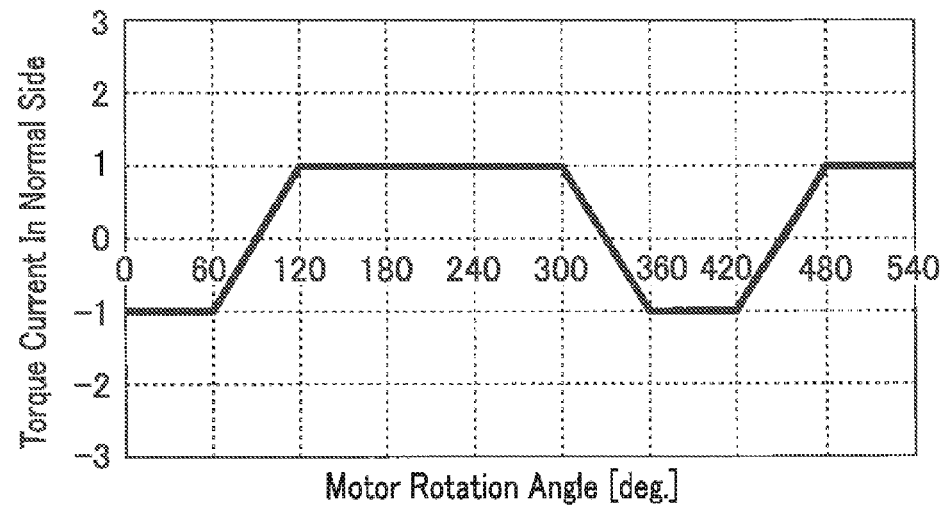

FIG. 13 is graphs showing motor-torque-waveform examples of motor torques in the fault side and in the normal side, and a total of them, according to Embodiment 4. Further, FIG. 14 is graphs showing waveform examples of torque currents in the fault side and in the normal side, according to Embodiment 4.

First, in order to make the settings in the fault side similar to the settings in Embodiment 1, the motor torque in the fault side is given as in FIG. 13(a), and the torque currents is given as in FIG. 14(a).

Thus, the fault-time fault-side command generator 42 becomes to have settings similar to in Embodiment 1.

Next, the settings in the normal side will be described.

The motor torque in the normal side is set as a torque in FIG. 13(b) in which a motor torque is subtracted in the range where the brake torque is generated in the fault side.

This increases the amplitude of the torque in the range where the brake torque is generated, to the degree corresponding to the subtracted torque.

As a result, the total waveform of the motor torques becomes like FIG. 13(c).

As compared to the amplitude of the torque ripple produced solely by the brake torque, since the torque in the same direction thereof is subtracted, it is possible to obtain a larger amplitude.

It is noted that in the above example, although all of the phase range where the brake torque is generated by the fault phase in the fault side is targeted, it may be limited to a part of the phase range where the brake torque is generated by the fault phase. Instead, it may be a range that includes a phase range where the brake torque is generated by the fault phase. Any of such patterns is allowable as far as the amplitude of the total motor torque becomes larger than the amplitude of the brake torque generated in the fault phase so that the user can recognize the fault by its torque ripple.

As described above, the fault-time current control means 30 of the motor control device according to Embodiment 4 generates the torque in which a torque in the same direction of the brake torque has been subtracted in the phase range including a part or all of the phase range where the brake torque is generated.

Thus, the torque gap becomes much larger, so that the user can surely recognize the fault by an uncomfortable feeling caused by the larger torque gap.

Up to the above, while the description has been made about the invention of a motor control device for recognizing a fault by using a torque ripple, the motor control device according to the invention can of course be applied to a power steering device for vehicle.

By applying the motor control device according to the invention to the power steering device, the user can detect a torque ripple when using the power steering device to thereby recognize a fault of the motor control device.

Industrial Applicability

This invention is useful to realize a motor control device which can emphasize a torque ripple when a fault in the windings of the motor or a fault in the inverters occurs, to thereby cause the user to recognize the occurrence of the fault.

Description Of Reference Numerals And Signs

4: power source, 5: motor, 6: motor rotation angle sensor, 10: motor control device, 15: first set of windings, 16: second set of windings, 21: first inverter, 22: second inverter, 23: current control means, 24: first switching-element driving circuit, 25: second switching-element driving circuit, 26: motor rotation-angle detection means, 30: fault-time current control means, 31: first normal-time current control means, 32: second normal-time current control means, 33: fault detection means, 34: fault-time normal-side command generator, 35: torque-current dividing means, 42: fault-time fault-side command generator, 50: phase-current command shaping means, UP1, VP1, WP1, UN1, VN1 and WN1: switching elements, UP2, VP2, WP2, UN2, VN2, WN2: switching elements, CT11, CT21, CT31, CT12, CT22, CT32: current detection circuits.

The invention claimed is:

1. A motor control device which controls a motor including plural sets of windings, comprising:
   a plurality of inverters each having switching elements for respective phases of each of the plural sets of windings, which control voltages applied to the respective phases;
   a current controller which controls currents caused to flow the plural sets of windings, by giving to each of the inverters, voltage commands corresponding to the voltages applied to the respective phases, according to a total required torque-current value that is equivalent to a target value of a torque to be generated by the motor; and
   a fault detector which detects a short-circuit fault in the switching elements, or an earth short-circuit or voltage short-circuit fault in the inverters or the plural sets of windings;
   wherein the current controller has a normal-time current controller which is used at normal time so as to control, respectively, the currents caused to flow the plural sets of windings, and a fault-time current controller which generates a fault-time voltage command according to a content of the fault detected by the fault detector;
   wherein, when the fault detector detects the fault, the current controller continues controlling the inverter in the normal side by the normal-time current controller while continuing controlling the inverter in the fault side by the fault-time voltage command generated by the fault-time current controller, to thereby emphasis a torque ripple; and
   wherein the fault-time current controller uses the phase without fault in the fault side and at least one of the respective phases in the normal side, to generate a torque calculated by adding, to a motor torque to be generated at normal time and in a phase range where a brake torque due to a fault phase is not generated, a reverse-direction torque against the direction of the brake torque.

2. The motor control device of claim 1, wherein the fault-time current controller causes a total torque of an output torque in the normal side and an output torque in the fault side, to be nearly equal in time average to an output torque at normal time.

3. The motor control device of claim 1, wherein the fault-time current controller generates the torque calculated by adding, over all of phase range where a brake torque due to a fault phase is not generated, the reverse-direction torque against the direction of the brake torque.

4. The motor control device of claim 1, wherein the fault-time current controller generates the torque calculated by adding, in the phase range which is adjacent to a phase range where a brake torque is generated, the reverse-direction torque against the direction of the brake torque.

5. The motor control device of claim 1, wherein the fault-time current controller generates the torque calculated by adding, in the phase range which is not adjacent to a phase range where a brake torque is generated, the reverse-direction torque against the direction of the brake torque.

6. The motor control device of claim 1, wherein intended torques are added both in the normal side and the fault side.

7. An electric power steering device which uses the motor control device of claim 1.

8. A motor control device which controls a motor including plural sets of windings, comprising:
- a plurality of inverters each having switching elements for respective phases of each of the plural sets of windings, which control voltages applied to the respective phases;
- a current controller which controls currents caused to flow the plural sets of windings, by giving to each of the inverters, voltage commands corresponding to the voltages applied to the respective phases, according to a total required torque-current value that is equivalent to a target value of a torque to be generated by the motor; and
- a fault detector which detects a short-circuit fault in the switching elements, or an earth short-circuit or voltage short-circuit fault in the inverters or the plural sets of windings;
- wherein the current controller has a normal-time current controller which is used at normal time so as to control, respectively, the currents caused to flow the plural sets of windings, and a fault-time current controller which generates a fault-time voltage command according to a content of the fault detected by the fault detector;
- wherein, when the fault detector detects the fault, the current controller continues controlling the inverter in the normal side by the normal-time current controller while continuing controlling the inverter in the fault side by the fault-time voltage command generated by the fault-time current controller, to thereby emphasis a torque ripple; and
- wherein the current controller adds in the fault side a reverse-direction torque against the direction of a brake torque, to set a total value of a torque to be generated in the normal side and a torque to be generated in the fault side so that the total value becomes larger as a rotation angle of the motor becomes closer to a rotation angle range where torque insufficiency emerges in the fault side.

9. A motor control device which controls a motor including plural sets of windings, comprising:
- a plurality of inverters each having switching elements for respective phases of each of the plural sets of windings, which control voltages applied to the respective phases;
- a current controller which controls currents caused to flow the plural sets of windings, by giving to each of the inverters, voltage commands corresponding to the voltages applied to the respective phases, according to a total required torque-current value that is equivalent to a target value of a torque to be generated by the motor; and
- a fault detector which detects a short-circuit fault in the switching elements, or an earth short-circuit or voltage short-circuit fault in the inverters or the plural sets of windings;
- wherein the current controller has a normal-time current controller which is used at normal time so as to control, respectively, the currents caused to flow the plural sets of windings, and a fault-time current controller which generates a fault-time voltage command according to a content of the fault detected by the fault detector;
- wherein, when the fault detector detects the fault, the current controller continues controlling the inverter in the normal side by the normal-time current controller while continuing controlling the inverter in the fault side by the fault-time voltage command generated by the fault-time current controller, to thereby emphasis a torque ripple; and
- wherein the fault-time current controller generates the torque in which a torque in the same direction of a brake torque has been subtracted in a phase range including a part or all of a phase range where the brake torque is generated.

10. An electric power steering device which uses the motor control device of claim 8.

11. An electric power steering device which uses the motor control device of claim 9.

\* \* \* \* \*